US006425057B1

United States Patent
Cherkasova et al.

(10) Patent No.: US 6,425,057 B1
(45) Date of Patent: Jul. 23, 2002

(54) CACHING PROTOCOL METHOD AND SYSTEM BASED ON REQUEST FREQUENCY AND RELATIVE STORAGE DURATION

(75) Inventors: Ludmila Cherkasova, Sunnyvale; Martin F. Arlitt, Palo Alto; Richard J. Friedrich, San Jose; Tai Jin, San Mateo, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/140,977

(22) Filed: Aug. 27, 1998

(51) Int. Cl.⁷ ............................................. G06F 12/12
(52) U.S. Cl. ...................................... 711/134; 709/219
(58) Field of Search ................................. 709/310–320, 709/219; 707/205; 711/118–146

(56) References Cited

U.S. PATENT DOCUMENTS

| | | | |
|---|---|---|---|
| 5,559,984 A | | 9/1996 | Nakano et al. ............. 711/121 |
| 5,748,954 A | * | 5/1998 | Mauldin ..................... 707/10 |
| 6,012,126 A | * | 1/2000 | Aggarwal et al. .......... 711/133 |
| 6,266,742 B1 | * | 7/2001 | Challenger et al. ........ 711/133 |
| 6,272,593 B1 | * | 8/2001 | Dujari ........................ 711/118 |
| 6,292,880 B1 | * | 9/2001 | Mattis et al. ............... 711/216 |
| 6,363,397 B1 | * | 3/2002 | Kitayama ............... 707/103 R |
| 6,385,699 B1 | * | 5/2002 | Bozman et al. ............. 711/133 |

OTHER PUBLICATIONS

Nicolas Niclausse, Zhen Liu, Philippe Nain, "A New Efficient Caching Policy for the World Wide Web", Proceedings of the 1998 Internet Server Performance Workshop (in conjuction with Signetics '98 ); Jun. 23, 1998, Madison, Wisconsin; pp. 1–16.

Pei Cao and Sandy Irani, "Cost–Aware WWW Proxy Caching Algorithms", Proceedings of USENIX Symposium on Internet Technologies and Systems, Monterey, California, Dec. 1997; pp. 193–206.

Neil Young, "Proceedings of The Second Annual ACM–SIAM Symposium on Discrete Algorithms", Association for Computing Machinery, New York; Society for Industrial and Applied Mathematics, Philadelphia; Chapter 27, pp. 241–250.

* cited by examiner

Primary Examiner—St. John Courtenay, III

(57) ABSTRACT

A method and system for caching objects and replacing cached objects in an object-transfer environment maintain a dynamic indicator (Pr(f)) for each cached object, with the dynamic indicator being responsive to the frequency of requests for the object and being indicative of the time of storing the cached object relative to storing other cached objects. In a preferred embodiment, the size of the object is also a factor in determining the dynamic indicator of the object. In the most preferred embodiment, the cost of obtaining the object is also a factor. A count of the frequency of requests and the use of the relative time of storage counterbalance each other with respect to maintaining a cached object in local cache. That is, a high frequency of requests favors maintaining the object in cache, but a long period of cache favors evicting the object. Thus, cache pollution is less likely to occur.

25 Claims, 4 Drawing Sheets

CACHING PROTOCOL METHOD AND SYSTEM BASED ON REQUEST FREQUENCY AND RELATIVE STORAGE DURATION

TECHNICAL FIELD

The invention relates generally to retaining objects in cache and, more particularly, to methods and systems for implementing a protocol for replacing cached objects with recently received objects.

BACKGROUND ART

With the growth of the World Wide Web, an increasingly large fraction of available bandwidth on the Internet is used to transfer Web documents. Access to the Web documents is generally structured around the HyperText Transfer Protocol (HTTP), which is a request-and-response protocol. When a user at a client device, such as a personal computer, designates a particular Web page, at least one request is generated. The number of requests is dependent upon the sophistication of the designated Web page. Often, a Web page is formed of a number of files, such as text files, graphics files, audio files and video files. Each one of the files is referred to as an "object." A multi-object page is aesthetically pleasing, but each object requires a separate request and a separate response. Therefore, each request-and-response round trip time plays a role in determining the total time a user must wait to view the complete designated Web page.

The total latency in downloading a Web page or other Internet document (e.g., a FTP file) depends upon a number of factors, including the transmission speeds of communication links between a client device and a server on which the file is stored, delays that are incurred at the server in accessing the document, and delays incurred at any-device located between the client device and the server. The intermediate devices may include proxies and routers. If there are a number of objects embedded within a Web page, the delays occur for each object.

Web proxies serve as intermediaries between browsers on a client side of an Internet connection and servers on the opposite side. An important benefit of a Web proxy is the ability of the proxy to cache objects. The caching operations of the Web proxy will be described with reference to FIG. 1. When a client device 12 generates a request 14 for a particular object, the cache of a proxy 16 is searched to determine whether the object is stored at the proxy. If the object is not found in the cache, the request is directed to a server 18 via the Internet 20. In FIG. 1, the requested object 10 is indicated in phantom. As an example, the object 10 may be a HTML file. A response 22 from the server is directed through the proxy 16 to the client device 12. Preferably, the object 10 that is contained within the response 22 is cached at the proxy 16. At a later time, either the same client device or a different client device 24 may generate a request 26 for the same object. The object 10 is in the cache of the proxy, allowing the object to be forwarded to the client device 24 directly from the proxy, as shown by response 28. This eliminates delays encountered in communicating between the proxy 16 and the server 18.

The first request 14 resulted in a "cache miss," since the requested object 10 was not retained in cache of the proxy 16. On the other hand, the second request 26 resulted in a "cache hit." By storing copies of objects, the proxy 16 can reduce the number of requests that are directed to servers 18, as well as the volume of traffic on Internet backbones as a result of transmitting the responses in the form of a number of packets that must be reassembled at the client device 12.

Ideally, the cache at the proxy 16 can retain all of the objects that are transferred through the proxy. However, the typical storage capacity for the proxy is in the range of 256 megabytes to 1 terabyte, with most Web proxy capacity being at the lower half of the range. Therefore, it is important to form a replacement strategy for determining which objects are evicted from cache when a recently received object is to be cached within exhausted storage space. Two important metrics that are used to measure proxy cache performance are cache hit rate and byte hit rate. The cache hit rate is the percentage of all user requests 14 and 26 that are satisfied by the proxy 16, rather than by access to the original server 18. Byte hit rate is the percentage of all network traffic, measured in bytes, transferred directly from the proxy cache, instead of across the external network.

There are a number of replacement strategies that have been proposed by the scientific community with regard to Web proxy caching. Some of the strategies are relatively simple and easy to implement, while others rely heavily upon setting parameters and are difficult to implement. A well organized survey of currently known Web replacement strategies is provided by Pei Cao and Sandy Irani in an article entitled, "Cost-Aware WWW Proxy Caching Algorithms," *Proceedings of USENIX Symposium on Internet Technologies and Systems*, Monterey, Calif., pages 193–206, December, 1997. The article describes ten previously known replacement algorithms.

According to the least-recently-used (LRU) algorithm, when an eviction is required in order to store a recently received object, the previously cached object that was requested least recently is evicted. This is a traditional strategy and operates well for CPU caches and virtual memory systems. However, it does not work as well for proxy caching, since time accesses for Web traffic often exhibit very different patterns. For example, some Web pages may be popular only during certain times of the day or certain days of the month.

A second known strategy is the least-frequently-used (LFU) algorithm that replaces the object which has been accessed the least number of times. This strategy attempts to keep more popular objects and replace rarely used objects. However, some objects can build a high frequency count over a short period of time and be rarely accessed after the subject matter is no longer "hot." Such objects often remain within cache long after network performance is enhanced by retaining the documents in cache. The traditional LFU strategy does not provide any mechanism to remove such documents, leading to "cache pollution." Typical examples are objects of a Web site dedicated to a one-time, high-profile event.

A third strategy is to evict the largest document stored in cache. This size strategy attempts to maximize the cache hit rate by evicting one large object, rather than a number of small objects. However, some of the small objects may never be accessed again. This third strategy does not provide any mechanism to evict such documents, leading to cache pollution.

A fourth strategy identified in the Cao and Irani article is referred to as an LRU-threshold strategy. This strategy is equivalent to the LRU policy, but it does not cache documents larger than a certain threshold size.

Another refinement of the LRU strategy is the log (size) +LRU strategy that replaces the document which has the largest log (size) and is the least recently used among the same log (size) documents. A hyper-G strategy is a refinement of the LFU strategy with last access time and size considerations. Yet another strategy is referred to as the Pitkow/Recker strategy that replaces the least recently used document, unless all of the documents were accessed on that particular day. In this case, the largest document is replaced. This strategy attempts to monitor the daily time access patterns specific to the Web documents. This replacement strategy has been proposed as one to run at the end of a day, in order to free space occupied by "old" least-recently accessed documents.

An eighth strategy is the lowest-latency-first policy that removes the document with the lowest download latency. The strategy is directed to minimizing average latency.

A ninth identified strategy is a hybrid policy that also targets reducing the average latency. For each object, a utility value of retaining the object in cache is computed. Objects with the smallest utility value are replaced. The utility value is designed to capture the utility of retaining a given object in the cache. The value is based upon a number of factors, including the time to connect with the server, the bandwidth of the server, the number of times that the object has been requested since it was brought into the cache, and the size of the object.

The last strategy identified in the Cao and Irani article is the lowest relative value (LRV) strategy that includes the cost and size of an object in the calculation of a value that estimates the utility of keeping a document in cache. The replacement algorithm evicts the object with the lowest value.

A refinement of the LFU strategy not identified in the Cao and Irani article has been proposed for caching, but not specifically proxy caching. The strategy places two limitations on the counts of object requests in the caching LFU algorithm: $A_{Max}$, which places an upper limit on the average request count for all objects in the cache; and $M_{Refs}$, which imposes an upper limit on the request count that can be assigned to a single object. Whenever the average request count for objects in the cache surpasses $A_{Max}$, the request count of each object in the cache is reduced by a factor of two. While this refinement may improve proxy performance, further improvements are desired. Implementation of the strategy requires a reoccurring "walk through" of the entire cache storage space in order to adjust the request count of each cached object. Thus, the processing requirements can be significant.

Cao and Irani propose a replacement strategy for web proxies which incorporates size of the cached objects into a previously known Greedy-Dual algorithm. The original Greedy-Dual algorithm dealt with the case in which pages in a cache (memory) had the same size, but had different costs to fetch them from the storage. The original algorithm associated a value H with each cached page p. Initially, when a page was brought to the cache, H was defined to be the cost of bringing the page into the cache (i.e., H=Cost). When a replacement was needed, the object with the lowest H value, $min_H$, was replaced and all of the H values of the remaining objects were reduced by $min_H$. If an object was accessed again, its current value H was restored to the original cost of obtaining the object to the cache. Thus, the H values of recently accessed pages maintained a large amount of the original cost, compared to objects that had not been accessed for a significant period of time.

In comparison, the Greedy-Dual-Size algorithm introduced the size of the object into the determination of the H value, so that H=Cost/Size, where Size is measured in bytes. To provide a high cache hit ratio, the Cost function of each object may be set to 1. In such a way, larger objects have a smaller H value than small objects, and are therefore more likely to be replaced if they are not referenced again in the near future. Setting the Cost to 1 favors small documents over large documents, especially those that are rarely referenced. Because there are a larger number of objects within the cache, the cache hit ratio will remain relatively high. However, the byte hit ratio may be sacrificed. A relatively high cache hit ratio and high byte hit ratio may be obtained by setting the Cost function for each object to 2+Size/536, which is the estimated number of network packets sent and received to satisfy a cache miss for the requested object. This setting of the Cost function provides a greater H value for larger objects than for smaller ones. It allows the objects having a small size to be replaced more readily than the larger objects, especially if the larger objects are often referenced. If a large object is seldom referenced, it will be replaced as a result of the steady decrease in the H value.

The Greedy-Dual-Size algorithm out performs previously known caching strategies with regard to a number of performance metrics, including cache hit ratio and byte hit ratio. However, the Greedy-Dual-Size algorithm does have at least one shortcoming, namely, that the algorithm does not take into account how many times the cached object was accessed in the past. An example is provided in how the Greedy-Dual-Size algorithm handles a hit and a miss for two different documents of the same size. When initially the documents are brought to the cache, both documents receive the same value of H=Cost/Size. The first document (doc 1), which was accessed a number of times in the past, will have the same value as the second document (doc 2) that is accessed from cache for the first time. Thus, in a worst case scenario, the frequently accessed doc 1 will be replaced, instead of the once-used doc 2, when it is time to replace one of the documents with an object having a higher H value.

What is needed is a method for systematically caching objects and replacing cached objects such that currently popular requested objects are likely to be stored in local cache but previously popular objects are readily replaced, thereby providing high cache hit and byte hit ratios. Ideally, such a method should have application not only to proxy cache management, but also to other types of cache management as well. The present invention solves these needs and provides further related advantages.

SUMMARY OF THE INVENTION

The present invention provides a method and a system for caching objects and replacing cached objects in an object transfer environment using a dynamic indicator for each object; the dynamic indicator is dependent upon frequency of requests for the object as well as upon time of storing the cached object relative to other cached objects. In one embodiment, frequency of requests is a factor that allows the dynamic indicator to exceed its original value, with relative time of storage providing a balance that reduces the possibility of cache pollution. In another embodiment, the size of the object is a factor in determining the dynamic indicator, and still further, in another embodiment, cost of obtaining the object (e.g., use of network resources) is also used as a factor.

The method and the system may be used to establish a replacement strategy for caching objects in local cache of a proxy connected to the Internet. The objects are received from servers via the Internet, and are directed to target devices, such as personal computers. The method and system may also be used in other cache management environments, such as for CPU cache management (e.g., "data compaction" for removing objects from localized cache). In at least some of these applications, objects can selected for eviction from cache even when the capacity of cache has not been reached, such as during times of processor inactivity.

In one embodiment, the dynamic indicator (Pr) of an object (f) is a function of the current relative storage time (Clock) of the object, the size of the object (Size(f)), the frequency of requests (Fr(f)) for the object, and the cost of the object (Cost(f)). In this embodiment, the dynamic indicator may be determined such that $$Pr(f) = Clock + Fr(f) \times \frac{Cost(f)}{Size(f)}. \quad \text{(EQ. 1)}$$

The indicator Pr(f) is "dynamic" with respect to the parameter Fr(f), since the value Fr(f) is adjusted each time that the object (f) is requested. The parameter Clock is a dynamic value that preferably is increased each time an object is evicted from local cache, and that is fixed for each object during storage in local cache. That is to say, later-cached objects will have a higher value of Clock (and therefore Pr(f)) than earlier cached objects. The clock function, therefore, is indicative of the "strength" of previously evicted objects. As a result of this mechanism, objects that have not been accessed for long periods of time are susceptible to eviction even if the frequency counts of the objects are high. Optionally, the determination of the dynamic indicator can be modified by including a coefficient (Alpha) as a multiple of the File frequency (Fr(f)).

If desired, the dynamic indicator and its determination can be simplified by eliminating one or both of the Cost and Size functions. If both of the functions are removed from the determination of Pr(f), the Clock and frequency functions will remain to provide a balance that favors current popularity over past popularity. For example, if the Size function is removed, but the Cost function is utilized, the algorithm (i.e., Pr(f)=Clock+Fr(f)×Cost(f)) operates well to provide a solution for conventional storage and cache paging concerns, in addition to use within a network environment.

In the practice of the method, if a request for the object (f) is received at a proxy from a client device, the local cache is searched to determine if the object is stored in local cache. For a cache hit, the object is served to the requesting client device. After the value of Fr(f) is adjusted, the dynamic indicator for the object (f) is re-computed. On the other hand, if the request results in a cache miss, the object is accessed from the remote server on which the object is stored. The object is served to the client device and a calculation of the dynamic indicator is initiated with using a frequency indication of "one," i.e., Fr(f)=1. A determination may then be made as to whether a replacement of a cached object is dictated by the caching strategy. This determination may involve a number of factors (e.g., factors that act to prevent the object from replacing a cached object that is likely to subsequently have a greater frequency count), or may merely involve a calculation of whether the object can be cached without replacing a previously cached object. When a replacement is dictated, an identification may be made of which file or files are to be evicted.

To prevent Clock and the frequency count Fr(f) from entering an overflow situation, an offset procedure may be implemented; when Clock has reached a predefined upper limit, an offset may be computed and the next assigned Clock value is reduced by the offset. Simultaneously, the dynamic indicators of all of the cached objects may be reduced by the offset.

To prevent the object frequency count from overflow and to guarantee the algorithm properties and performance, the count preferably stops at an upper limit (e.g., $10^8$). Such a high value of the object's frequency count will generally guarantee that the dynamic indicator for the cached object will inhibit replacement of the object. On the other hand, if the object frequency count has reached the upper limit and it has not been accessed for a long time, eventually Clock will exceed the upper limit, and all the newly accessed objects will have higher Pr(f) values, allowing the replacement of the cached object. Such an approach prevents the cache from becoming polluted with "hot" files which become "out of interest" and rarely or never are accessed again.

DETAILED DESCRIPTION

Figure 2:
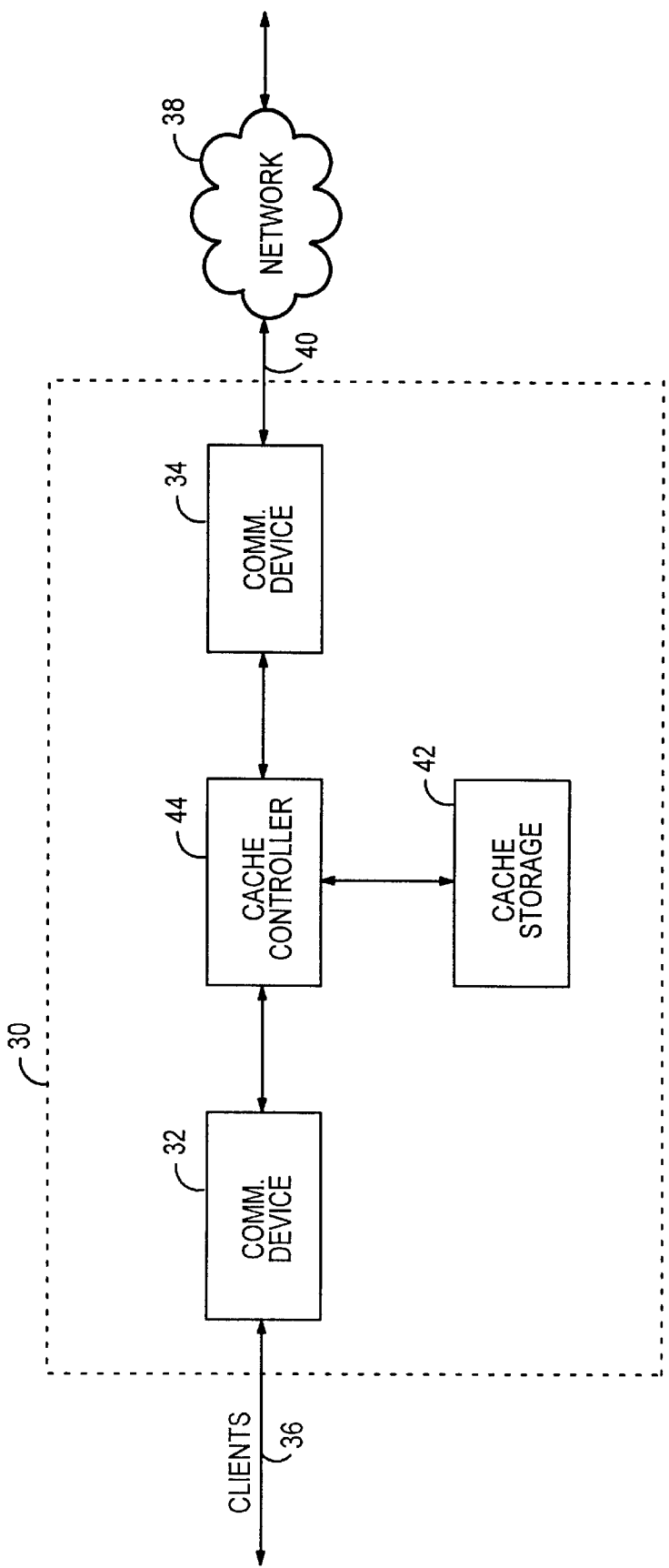
FIG. 2 is a block diagram of components of a proxy that are relevant to a cache replacement method and system in accordance with the preferred embodiment.

With reference to FIG. 2, the preferred embodiment will be described and illustrated primarily as it applies within a network environment. However, the system and method may be used in other applications, such as CPU or other cache management, garbage collection, etc.

In FIG. 2, a proxy 30 is shown as including a client-side communication device 32 and a network-side communication device 34. The communication devices may be any of a variety of available devices for routing communications using known switching mechanisms that are implemented in computer hardware or software. For example, the client-side communication device 32 may be an array of modems for channeling Web page objects to personal computers via conventional telephone lines 36. On the other hand, the network-side communication device 34 may be switching circuitry for connection to a network 38 via Ti lines 40. In the preferred embodiment, the network 38 is the global communications network referred to as the Internet.

Figure 1:
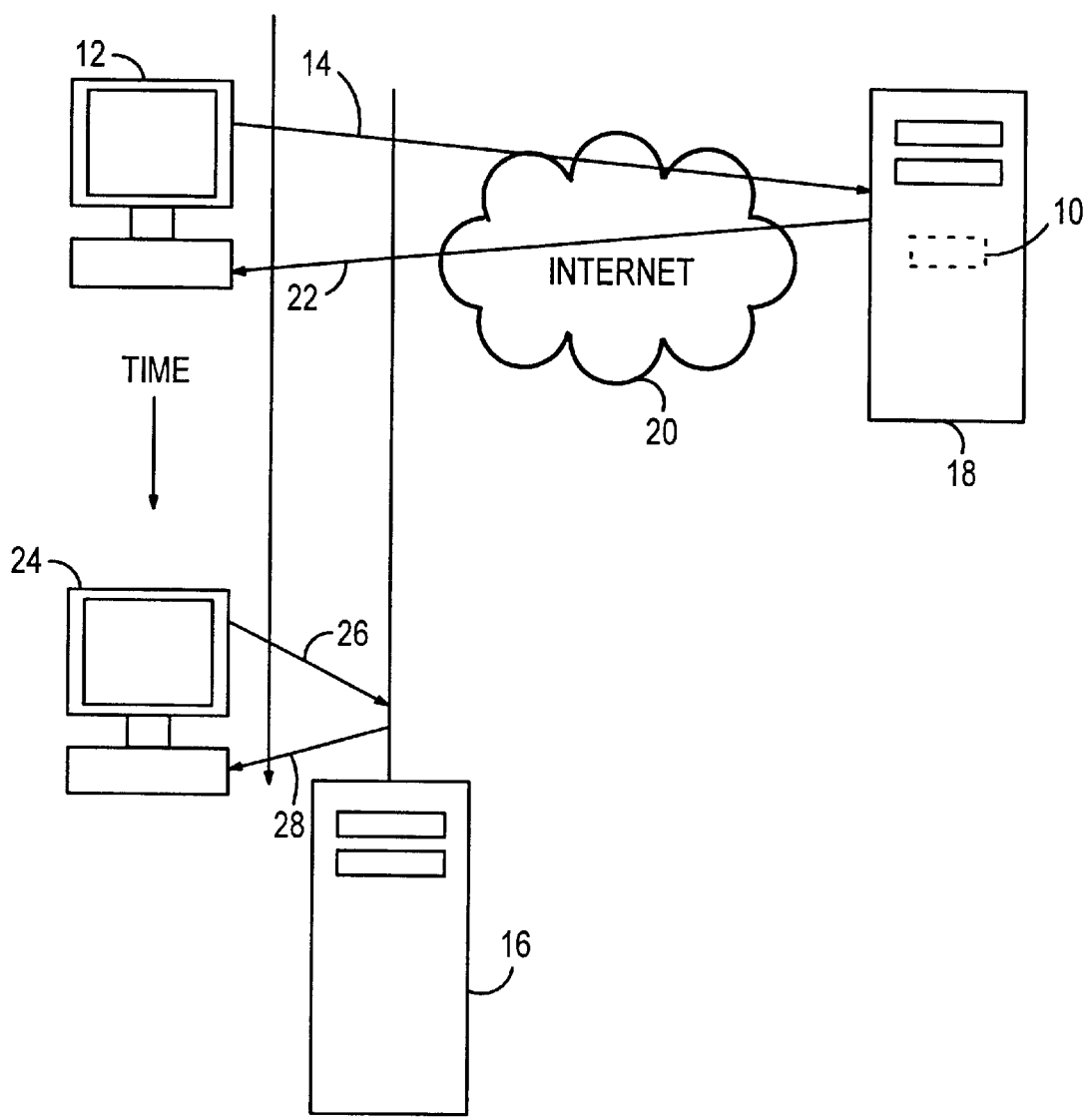
FIG. 1 is a schematic view of a known system for implementing a request-and-response protocol for providing objects, such as Web documents, to client devices.

The proxy 30 is able to access Web pages and other files stored on remote servers, not shown, via the network 38. As previously described with reference to FIG. 1, a request 14 from a client device 12 is initially satisfied by a response from a remote server 18. If desired, the object transferred in response to the request may be retained within proxy storage, so that a second request 26 may be satisfied directly from the proxy, as indicated by the response 28 in FIG. 1. Similarly, the proxy 30 of FIG. 2 includes local cache 42 for retaining objects. The objects that are stored may be components of a Web page, such as audio files, HTML files, graphic files or video files. The objects may also be other files that are transferred via the Internet, such as File Transfer Protocol (FTP) transfers.

A cache controller 44 determines the content of the local cache 42. Some objects are un-cachable, such as secured objects and file forms that are completed by inputs from a user at a client device prior to transfer from a server to the client device. In the preferred embodiment, the cache controller 44 has the ability to distinguish cachable and non-cachable objects. As will be explained more fully below with reference to FIG. 4, a more important role of the cache controller is to determine which objects are to be evicted from the local cache 42 when a replacement condition has been detected, such as when cache capacity has been exhausted. Thus, when a recently received object is eligible for caching, the controller 44 determines whether previously cached objects are to be evicted from storage 42 and identifies which objects are to be evicted, if any. If it is determined that a recently received object is likely to be less "popular" than presently cached objects, the recently received object remains un-cached.

The replacement strategy that is implemented by the cache controller 44 in determining which objects are to be stored in local cache 42 and which objects are to be evicted can be reduced to comparisons of dynamic indicators (Pr) which are functions of relative times (Clock) of cache and frequencies (Fr) of requests for objects. In this simplest form, the dynamic indicator of each object (f) may be determined by the relation $$Pr(f) = Clock + Fr(f). \quad (EQ. 2)$$

A specific advantage of this first embodiment is its simplicity, i.e., no adjustments or fine tuning are required and for that very reason this first embodiment will be preferred in many applications. The quantity "Clock" can be any function that differentiates storage time of different objects. Preferably, the quantity Clock is not a mere time stamp of entering the object (f) into cache, but rather, a number which is larger for files that have been received relatively recently. The quantity Clock may be thought of as indicative of the "strength" of previously evicted objects, since it increases in accordance with caching activity. For example, in one embodiment, each time that a cached object is evicted from local cache 42, Clock may be increased by the value of the dynamic indicator of the evicted object. That is, $$Clock_{new} = Clock_{old} + Pr(f)_{evicted}. \quad (EQ. 3)$$

Since a current Clock value is used to calculate each Pr(f) value, the values of $Pr(f)_{evicted}$ are related to $Clock_{old}$. Therefore, an alternative to Equation 3 is $$Clock_{new} = Pr(f)_{evicted}. \quad (EQ. 4)$$

The replacement strategy of Equation 2 provides a high byte hit ratio, since it is independent of the size (Size) of the files. In a second embodiment, however, the cost of acquiring an object (Cost) is also considered. The cost of an object may be exclusively related to the use of network resources to download the object from a remote server, but may also have a monetary value (e.g., pay-per-view files).

In a third embodiment, the dynamic indicator of a particular object (f) is determined using the relation $$Pr(f) = Clock + Alpha \times Fr(f) \times \frac{Cost(f)}{Size(f)}. \quad (EQ. 5)$$

This formulation achieves a relatively higher cache hit ratio than the formulation of Equation 2 because it factors size of the objects into the replacement strategy. Alpha is an optional term that can be used to vary the relative weight of the various terms of Equation 5. Alternatively, Alpha can be adjusted to weight the influence of object types, caching times, protocols used for object retrieval, and/or object sources.

As will be discussed below, Clock is preferably computed based on an initial value of zero. Consequently, Equations 3–4 and 5 will weight all dynamic indicators in a manner that is directly proportional to Alpha, e.g., the particular choice of a constant, non-zero and positive Alpha as a weighting factor is unimportant. However, if another valuation of Clock is used, or if additional terms are added to the right side of Equation 5, then a constant Alpha may be effective to tune the importance of size or cost relative to other terms. If desired, Alpha can also vary in a manner to prioritize certain objects as opposed to others for insertion into the local cache. For example, prediction information may be available for frequency of objects, e.g., certain objects may have attributes which at the time of retrieval indicate that the objects will be popular. As an example of weighting the influence of the types of objects, since HTML and image objects tend to receive the most requests in a WWW environment, objects of these types may be assigned an Alpha of "2," while objects of all other types may be assigned an Alpha of "1." Alternatively or additionally, in a time-dependent implementation, the assignment of Alpha may be made dependent upon the times at which objects are requested; if objects that are requested during off-peak hours are more likely to be requested only by the single user, Alpha may be defined to be a lower value during off-peak hours than during peak hours. In the protocol-dependent implementation, an object of a particular protocol (e.g., HTTP) may be given an Alpha greater than objects that are retrieved using "less popular" protocols (e.g., FTP or Gopher). In the source-dependent implementation, the value of Alpha assigned to an object is adjusted according to the "popularity" of objects from particular sources (e.g., objects from a particular WWW server).

Figure 3:
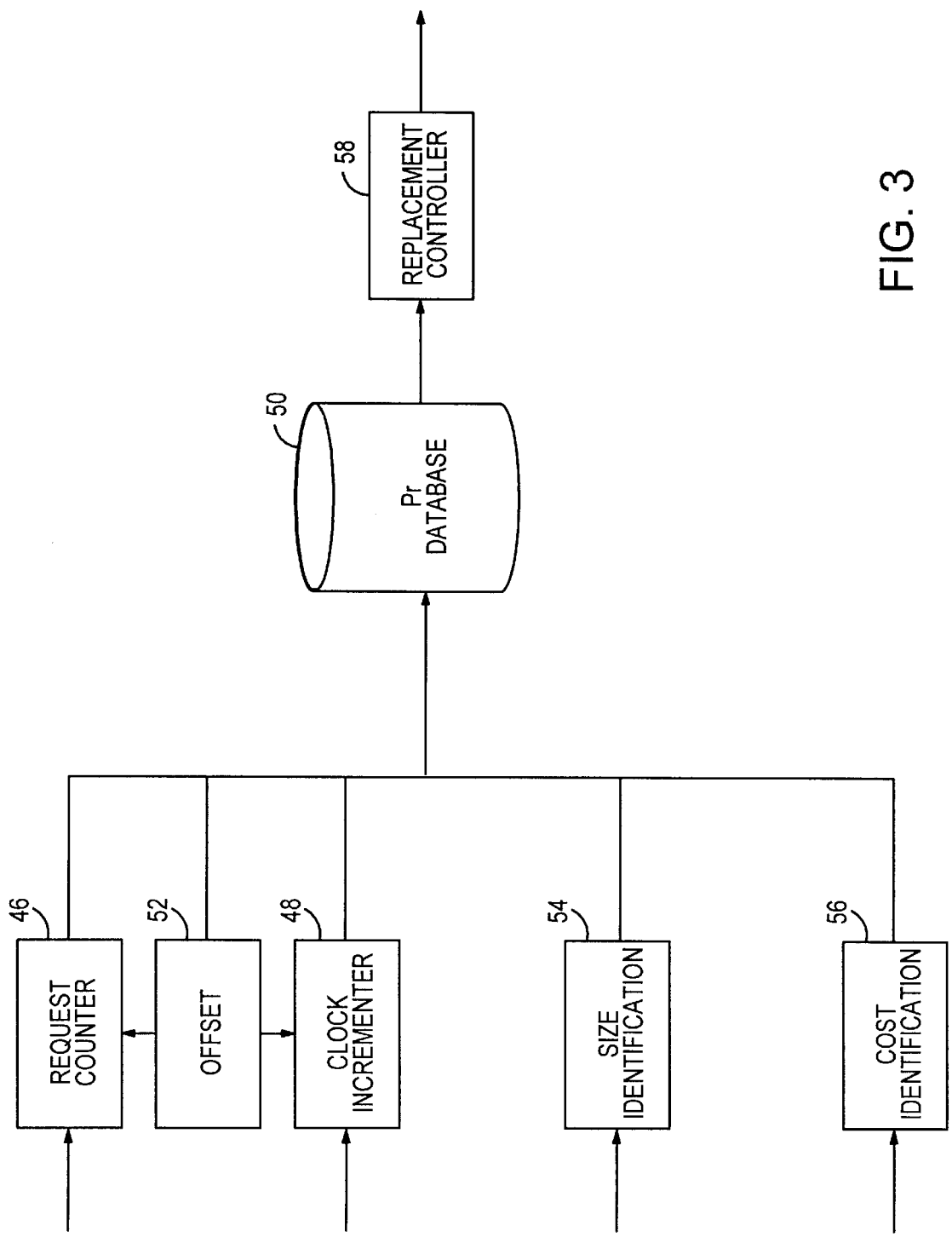
FIG. 3 is a block diagram of components of the cache controller of FIG. 2 in accordance with the preferred embodiment.

Referring now to FIG. 3, possible components of the cache controller 44 of FIG. 2 are shown to include a request counter 46 and a clock incrementer 48. As will be readily understood by persons skilled in the art, the components of the cache controller may be formed primarily or exclusively in computer software. The request counter 46 detects each request for an object and adjusts the dynamic indicator for the object. If the requested object is one that has not previously been stored in local cache, then the dynamic indicator is determined using a value of "one," i.e., Fr(f)=1.

An incrementer 48 is used to determine the value of Clock. Clock is a running value that may start at 0 and increment for each evicted file ($f_{evicted}$) by the value of the dynamic indicator of the evicted object. At the time an object is received, it is assigned the current value of Clock. Thus, the first object that is stored in local cache will have a Clock value of "0." Clock will not be changed for any subsequently cached objects until an object is evicted to provide storage space. Once an object is evicted, the incrementer 48 then determines a new clock value according to Equation 3 or Equation 4, and objects then received are assigned the new clock values and so on. Other valuations that provide an indication of relative timing of storage of an object may be substituted.

An offset mechanism 52 (implemented in hardware or software) may be used to prevent Clock from reaching an excessive value. As previously noted, Clock is re-computed each time that an object is evicted from local cache 42. The offset mechanism 52 may be enabled to monitor the value of Clock assigned by the incrementer 48 and to trigger an offset adjustment process when Clock reaches a preselected number. The preselected number is not critical to the invention.

In addition to subtracting an offset, the offset mechanism 52 preferably also subtracts the offset from each one of the priority indicators that are stored in the Pr database 50. In the preferred embodiment, the database 50 is arranged to provide a priority queue of dynamic indicators, but care must be taken to avoid the creation of negative dynamic indicators through subtraction of the offset.

The offset mechanism 52 is also used to monitor the frequency counts for the cached objects. In the preferred embodiment, the frequency count of an object has a maximum value, so that the count does not overflow. For example, when the count reaches an upper limit, it remains unchanged. A value of the object frequency count will generally guarantee that the object will remain in local cache 42 for a fair amount of time. However, if the object is not accessed for a long time period, eventually Clock will exceed the upper limit of object frequency count, and all the newly accessed objects will be cached with a higher dynamic indicator, allowing the previously "hot" object to be replaced. Such an approach prevents cache pollution with hot files which are now out of interest and seldom or never accessed.

In the third embodiment in which both of the size of the cached object (Size) and the cost of obtaining the object (Cost) are employed in the replacement strategy, both of a size identification mechanism 54 and a cost identification mechanism 56 are also used. Means for calculating Size and Cost include any mechanisms conventionally used for performing such calculations in the art, and need not be explained in extensive detail herein. Outputs from the request counter 46, the incrementer 48, and the size and cost identification mechanisms 54 and 56 provide the relevant measures to the Pr database 50 for calculation of the dynamic indicators. A replacement controller 58 accesses the information in the Pr database 50 to execute the replacement strategy.

Figure 4:
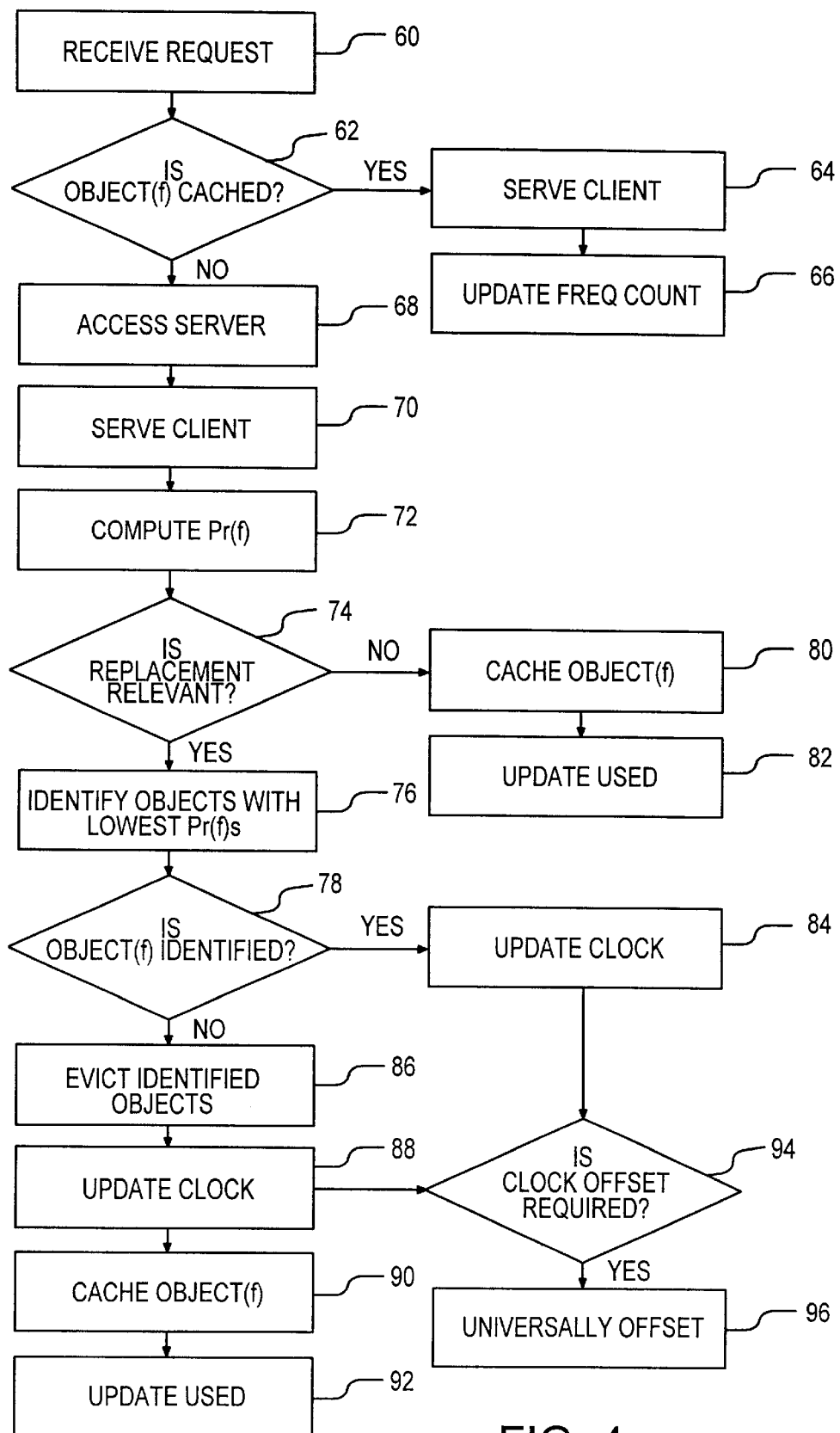
FIG. 4 is a process flow diagram for implementing the cache replacement strategy in accordance with the preferred embodiment.

FIG. 4 is a process flow of steps that occur when a request for a particular object is received at the proxy 30 of FIG. 2 from a client device (not seen in FIG. 4). In step 60, the request for object (f) is received. Step 62 determines whether there is a cache hit or a cache miss. If the object (f) is cached, local cache 42 is accessed and the client device is served at step 64. That is, a cache hit allows the requested object to be directed to the target client without requiring contact with a server from which the object was originally obtained via a network connection. In step 66, the frequency count for object (f) found in local cache is updated. Typically, the update is executed by incrementing the Fr(f) value by 1. As seen in Equation 2 and Equation 5, incrementing the Fr(f) value changes the dynamic indicator Pr(f).

If at determination step 62 a cache miss is identified for the requested object (f), the appropriate server is accessed at step 68 and the client device is served using known techniques at step 70. In step 72, the dynamic indicator is calculated for the object (f). If Equation 5 is utilized, each of the request counter 46, the incrementer 48, and the size and cost identification mechanisms 54 and 56 are employed in step 72. The request count will be at a minimum of 1, and the values of Clock will be dependent upon factors that include the number of cache replacements that previously occurred.

OTHER EMBODIMENTS

As previously noted, the replacement strategy may be used in applications other than HTTP proxy caching. For example, the strategy may be implemented during times of system inactivity to provide "data compaction" for cache management, especially in an environment where the cost of making cache space available is relatively high. The strategy may be implemented in server cache management, CPU cache management, or other types of cache management. Some of the remaining steps (i.e., steps 74–96) of FIG. 4 may be advantageously applied to these systems.

Steps 74, 76 and 78 determine whether a replacement condition for evicting a cached object is present. The replacement condition may be a condition in which the object (f) cannot be cached without exhausting cache space, but more complex conditions may be relevant. For example, some proxy caches will invoke a replacement policy when the cache utilization exceeds a specified value (e.g., X% of all cache space, with $X \leq 100\%$). Moreover, the execution of the replacement policy may free up more space than is needed to cache the most recently requested object (f). For example, when the replacement strategy is invoked, many caches will remove objects until a second threshold is reached (e.g., Y% of the cache space is utilized, with $Y \leq X$). Another approach is to perform replacements periodically in order to "smooth" out the processing work load (i.e., periodically perform a manageable amount of work, rather than more extensive work each time that the upper threshold is reached). Therefore, the determination step 74 may require a computation of the storage requirements for caching object (f). If it is determined that the recently received object (f) can be cached without evicting any cached objects, the object (f) is stored in cache at step 80. The calculation of the amount of used cache is then updated at step 82 using the formula $$\text{Used}_{new} = \text{Used}_{old} + \text{Size}(f). \quad \text{(EQ. 6)}$$

In step 74, if it is determined that the recently received object (f) will cause the replacement strategy to be invoked (e.g., $\text{Used}_{old} + \text{Size}(f) > X\%$ of Capacity), step 76 identifies the cached object or objects with the lowest Pr values that enable caching of the recently received object (f) when evicted from cache. If replacement is relevant because more than X% of capacity is exhausted, the first k files ($k \approx 1$) with the lowest dynamic indicator values are chosen to satisfy the condition $\text{Used}_{new} \leq Y\%$ of capacity, where $$Used_{new} = Used_{old} + Size(f) - \sum_{i=1}^{k} Size(f_i). \quad \text{(EQ. 7)}$$

In the execution of step 76 of identifying the objects ($f_1, f_2, \ldots f_k$), the recently received object (f) having the Pr(f) value computed in step 72 may be considered. If the objects that are stored in local cache have a high frequency of requests (Fr), the recently received object may be the only object or one of the objects identified in the step 76. In this situation, the recently received object is not cached. None of the previously cached objects is evicted. Nevertheless, Clock is preferably updated at step 84 using Equation 3 or Equation 4.

Since the Clock value for a recently received object (f) is likely to be higher than the values of Clock of many of the previously cached objects, the recently received object will likely not be identified in step 76. A negative response at the decision step 78 will trigger the step 86 of evicting the k files identified in step 76. Clock is then updated at step 88, using Equation 3 or Equation 4. When k>1, the updated Clock may be determined by the formula $$Clock_{new} = Clock_{old} + \sum_{i=1}^{k} Pr(f_i). \quad \text{(EQ. 8)}$$

The recently received object (f) is cached at step 90 and the value of Used$_{new}$ is calculated at step 92 using Equation 7. Alternatively, Clock$_{new}$ can be calculated using the equation $$\text{Clock}_{new}=\text{Max}(Pr(f_1), \ldots Pr(f_k)). \quad \text{(EQ. 9)}$$

Returning to step 88, the update of Clock may trigger the Clock offset process described above with reference to the offset mechanism 52 of FIG. 3. Each time that Clock is updated at step 84 or 88, the determination step 94 is triggered. The offset mechanism 52 detects a condition in which the threshold of Clock is reached. If in step 94 it is determined that the threshold has not been reached, the offset mechanism 52 is returned to an inactive condition. On the other hand, if the threshold has been reached, Clock and all of the dynamic indicators stored in the Pr database 50 are reduced by an offset value when the threshold is reached, as indicated by step 96 in FIG. 4.

Importantly, in some applications it may always be desired to place a newly received object into cache at the expense of objects having the smallest dynamic indicators. In such applications, upon receiving a new object, a sufficient number of objects have the smallest dynamic indicators are identified for eviction in order to make room for the newly received object.

Having thus described several exemplary implementations of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A method of caching objects and replacing cached objects comprising:

receiving a plurality of objects from remote sites via network connections, the objects being directed to target devices, storing at least some of the objects in local cache, thereby providing cached objects that are accessible without reconnecting to the remote sites;

maintaining dynamic indicators for at least some of the cached objects, where different dynamic indicators correspond to different cached objects, each dynamic indicator being responsive to a frequency of requests for a corresponding cached object by the target devices and being indicative of a time of storing the corresponding cached object in the local cache relative to storing other cached objects in the local cache such that a determination for each dynamic indicator is at least partially based on a storage occurrence of the corresponding cached object relative to storage occurrences of other cached objects; and selectively replacing cached objects with recently received objects based upon the dynamic indicators such that the cached objects are removed from the local cache on the basis of frequencies of requests and relative times of storing said cached objects.

2. A method according to claim 1 wherein maintaining the dynamic indicators and selectively replacing the cached objects are performed such that (1) cached objects having higher frequencies of requests are less likely to be replaced than cached objects having lower frequencies, and (2) cached objects with shorter relative times are less likely to be e replaced than cached objects having longer relative times.

3. A method according to claim 1 wherein maintaining the dynamic indicators includes factoring a size of the corresponding cached object into each dynamic indicator, each cached object thereby being associated with a dynamic indicator that is specific to frequency of requests and is indicative of size and relative time of storing the corresponding cached object.

4. A method according to claim 3 wherein maintaining the dynamic indicators and selectively replacing cached objects are performed such that (1) cached objects having higher frequencies of requests are less likely to be replaced than cached objects having lower frequencies, (2) cached objects having smaller sizes are less likely to be replaced than cached objects having larger sizes, and (3) cached objects with shorter relative times are less likely to be replaced than cached objects having longer relative times.

5. A method according to claim 1 wherein maintaining the dynamic indicators includes factoring into the dynamic indicator a cost of acquiring a corresponding cached object from a remote site, the cost related to latency in receiving the corresponding cached object.

6. A method according to claim 1 wherein receiving a plurality of objects includes accessing objects from servers via the Internet, the local cache being located at a proxy.

7. A method according to claim 1 wherein maintaining the dynamic indicators includes factoring into a dynamic indicator for a recently received object a dynamic indicator for an object that has been selectively replaced.

8. A method according to claim 1 wherein maintaining the dynamic indicators includes establishing assigning a value, the value being substantially fixed with respect to a corresponding cached object, but being adjusted each time that selective replacement of a cached object occurs, such that the assigned value is indicative of an order in which cached objects were placed in the local cache.

9. A method according to claim 1 further comprising determining whether a recently received object is to be stored in local cache, including assigning a specific dynamic indicator to the recently received object and comparing the specific dynamic indicator to dynamic indicators of other cached objects.

10. A method according to claim 9 wherein selectively replacing cached objects includes selectively replacing cached objects only when (1) a preselected portion of a capacity of local cache would be exhausted by storing the recently received object and (2) comparison of the specific indicator to the dynamic indicators favors storing the recently received object to one or more cached objects.

11. A method of caching objects and replacing cached objects comprising:

establishing a protocol for replacing objects stored in local cache, the protocol being dependent upon indications of frequency of requests (Fr) for an object (f), cost (Cost) of acquiring the object from at least one source, and a time (Clock) of accessing the object in the local cache, such that each object has a priority key (Pr(f)) that is indicative of $Pr(f)=\text{Clock}+Fr(e)\times\text{Cost};$ storing a plurality of the objects in the local cache, each object having an assigned priority key Pr(f);

adjusting the indication of frequency Fr(f) for a specific object upon receiving a request for the specific object; and selectively replacing the objects in the local cache with recently received objects based upon the protocol.

12. A method according to claim 11 wherein establishing the protocol includes defining Clock to be indicative of priority keys (Pr(f)$_{evicted}$) of objects previously replaced according to the protocol.

13. A method according to claim 11 wherein forming the protocol includes providing a tunable coefficient (Alpha) such that

*Pr(f)*=Clock+Alpha×*Fr(f)*×Cost.

14. A method of caching objects and replacing cached objects comprising:

establishing a protocol for replacing objects stored in local cache, the protocol being dependent upon indications of frequency of requests (Fr) for an object (f) and a time (Clock) of accessing the object in the local cache, such that each object has a priority key (Pr(f)) that is indicative of

*Pr(f)*=Clock+*Fr(f)*;

storing a plurality of the objects in the local cache, each object having an assigned priority key Pr(f);

adjusting said indication of frequency Fr(f) for a specific object upon receiving a request for said specific object; and selectively replacing the objects in the local cache with recently received objects based upon the protocol.

15. A method according to claim 14 wherein establishing the protocol includes defining Clock to be indicative of priority keys (Pr(f)$_{evicted}$) of objects previously replaced according to the protocol.

16. A method according to claim 14 wherein forming the protocol includes providing a tunable coefficient (Alpha) such that

*Pr(f)*=Clock+Alpha×*Fr(f)*.

17. A method of caching objects and replacing cached objects comprising:

establishing a protocol for replacing objects stored in local cache of a proxy cache, the protocol being dependent upon indications of frequency of requests (Fr) for an object (f), size (Size) of the object and duration (Clock) of storing the object in the local cache, such that each object has a priority key (Pr(f)) that is indicative of $$Pr(f) = Clock + \frac{Fr(f)}{Size(f)};$$

storing a plurality of the objects in the local cache, each object having an assigned priority key Pr(f);

adjusting the indication of frequency Fr(f) for a specific object upon receiving a request for the specific object; and selectively replacing the objects in the local cache with recently received objects based upon the replacement protocol.

18. A method according to claim 17 wherein forming the replacement protocol further includes providing an indication of the cost (Cost(f)) of resources in obtaining a corresponding object such that $$Pr(f) = Clock + Fr(f) \times \frac{Cost(f)}{Size(f)}.$$

19. A method according to claim 17 wherein forming the protocol includes providing a tunable coefficient (Alpha) that is selected for a corresponding object according to at least one of (1) an object type of the corresponding object within a set of different object types, (2) a time of day at which the corresponding object was stored in the local cache, (3) a protocol used in receiving the corresponding object from a source, and (4) the source of the corresponding object prior to storage in the local cache.

20. A method according to claim 17 wherein forming the replacement protocol further includes utilizing a tunable coefficient (Alpha) such that $$Pr(f) = Clock + Alpha \times \frac{Fr(f)}{Size(f)}.$$

21. A method according to claim 17 further comprising, when an un-cached object is received at the cache, determining whether to replace objects based upon the protocol.

22. A method according to claim 17 wherein storing the objects includes receiving the objects via the Internet.

23. A system for caching objects and replacing cached objects comprising:

switching means for providing connectivity between a plurality of remote servers of objects and a plurality of clients requesting the objects;

local cache means for selectively storing objects requested by the clients via the switching means; and replacement protocol controller means for governing caching of objects based on values of dynamic indicators that are specific to corresponding objects in the local cache means, each dynamic indicator being responsive to a frequency of requests for the corresponding object by the plurality of clients and a clock indicative of a relative time of storing the corresponding object in the local cache means in relation to storing other objects, the replacement protocol controller means replacing cached objects with recently requested objects in an order determined by the dynamic indicators.

24. A system according to claim 23 further comprising means for assigning the dynamic indicators to the objects on a one-to-one basis in response to cost of resources in obtaining the objects.

25. A system according to claim 23 further comprising means for updating the dynamic indicators when requests for objects stored in the local cache means are received from the clients.

* * * * *